US012662129B2

(12) United States Patent　(10) Patent No.:　US 12,662,129 B2
Osumi　(45) Date of Patent:　Jun. 23, 2026

(54) INFORMATION PROCESSING APPARATUS AND INFORMATION PROCESSING METHOD FOR SECURING PROVIDING VEHICLE DRIVER INFORMATION

(71) Applicant: TOYOTA JIDOSHA KABUSHIKI KAISHA, Toyota (JP)

(72) Inventor: Ryota Osumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 18/469,280

(22) Filed: Sep. 18, 2023

(65) Prior Publication Data

US 2024/0092368 A1　Mar. 21, 2024

(30) Foreign Application Priority Data

Sep. 20, 2022　(JP) ................................. 2022-149419

(51) Int. Cl.
*B60W 40/08*　(2012.01)
*B60W 50/14*　(2020.01)

(52) U.S. Cl.
CPC ............ *B60W 40/08* (2013.01); *B60W 50/14* (2013.01); *B60W 2040/0809* (2013.01); *B60W 2540/215* (2020.02)

(58) Field of Classification Search
None
See application file for complete search history.

(56) References Cited

U.S. PATENT DOCUMENTS

| | | | |
|---|---|---|---|
| 2015/0140991 A1* | 5/2015 | Silver | .................... G06N 20/00 |
| | | | 455/418 |
| 2015/0191178 A1* | 7/2015 | Roy | ........................ H04W 4/48 |
| | | | 701/36 |
| 2017/0046528 A1 | 2/2017 | Lambert | |
| 2018/0267968 A1 | 9/2018 | Shimota | |
| 2019/0034602 A1 | 1/2019 | Votaw et al. | |
| 2020/0019163 A1 | 1/2020 | Horii et al. | |
| 2020/0302089 A1* | 9/2020 | Barday | ................. G06F 16/904 |
| 2022/0035840 A1 | 2/2022 | Nakayama | |

(Continued)

FOREIGN PATENT DOCUMENTS

| | | |
|---|---|---|
| CN | 108632336 A | 10/2018 |
| CN | 114115205 A | 3/2022 |

(Continued)

OTHER PUBLICATIONS

Espacenet English Translation of JP-2012037451-A (Year: 2012).*

*Primary Examiner* — Abdhesh K Jha
*Assistant Examiner* — Andrew Sang Kim
(74) *Attorney, Agent, or Firm* — Sughrue Mion, PLLC

(57) ABSTRACT

An information processing apparatus to be mounted on a first vehicle, the information processing apparatus comprises a controller configured to: determine whether there is a record of consent, expressed in the past, from a driver of the first vehicle for acquisition, by an external apparatus, of first data acquired by the first vehicle during traveling, and issue an inquiry to the driver, in a case where there does not exist the record of the driver giving the consent for acquisition of the first data by the external apparatus, as to whether the driver gives the consent for acquisition of the first data by the external apparatus or not.

11 Claims, 13 Drawing Sheets

(56)    References Cited

U.S. PATENT DOCUMENTS

| | | |
|---|---|---|
| 2022/0070637 A1 | 3/2022 | Yang et al. |
| 2022/0318425 A1* | 10/2022 | Herman ................ G06F 21/316 |

FOREIGN PATENT DOCUMENTS

| | | | |
|---|---|---|---|
| JP | 2012037451 A | * | 2/2012 |
| JP | 2018-180689 A | | 11/2018 |
| JP | 2021-81841 A | | 5/2021 |
| WO | 2020/115862 A1 | | 6/2020 |

\* cited by examiner

1. REQUEST TRANSMISSION OF DATA

2. VEHICLE-MOUNTED APPARATUS GENERATES DATA

3. TRANSMIT DATA WHEN THERE IS CONSENT OF DRIVER

VEHICLE-MOUNTED APPARATUS 100

VEHICLE 10

SERVER APPARATUS 200

| VEHICLE ID | DATE/TIME | DATA TYPE | | SENSOR DATA | |
|---|---|---|---|---|---|
| | | POSITION INFORMATION | | ⋮ | ⋮ |
| V001 | ⋮ | | | | |
| V001 | ⋮ | SPEED INFORMATION | | ⋮ | ⋮ |
| ⋮ | ⋮ | ⋮ | | ⋮ | ⋮ |

FIG. 3

| DATA ID | DATA TYPE | TRANSMISSION DESTINATION | ACQUISITION CONDITION | TRANSMISSION PERIOD |
|---------|-----------|-------------------------|----------------------|---------------------|
| ⋮ | IMAGE DATA | MANAGEMENT SERVER 200 | ACQUIRE AT DESIGNATED POINT (...) | ONLY ONCE |
| ⋮ | POSITION INFORMATION | MANAGEMENT SERVER 200 | DURING TURNING ON OF IGNITION | EVERY SECOND |
| ⋮ | PERSONAL INFORMATION | MANAGEMENT SERVER 200 | WHEN IGNITION IS ON | ONLY ONCE |
| ⋮ | ⋮ | ⋮ | ⋮ | ⋮ |

FIG. 4

| DRIVER ID | DATA TYPE | TRANSMISSION DESTINATION | TRANSMISSION PERMISSION | ... |
|---|---|---|---|---|
| D001 | POSITION INFORMATION | MANAGEMENT SERVER 200 | PERMITTED | ... |
| D001 | PERSONAL INFORMATION | MANAGEMENT SERVER 200 | DENIED | ... |
| ... | ... | ... | ... | ... |

FIG. 5

| DRIVER ID | DATA TYPE | TRANSMISSION DESTINATION | TRANSMISSION PERMISSION | DATE/TIME OF CHECK | ⋮ |
|---|---|---|---|---|---|
| D001 | POSITION INFORMATION | MANAGEMENT SERVER 200 | PERMITTED | ⋮ | ⋮ |
| D001 | PERSONAL INFORMATION | MANAGEMENT SERVER 200 | DENIED | ⋮ | ⋮ |
| ⋮ | ⋮ | ⋮ | ⋮ | ⋮ | ⋮ |

FIG. 11

INFORMATION PROCESSING APPARATUS AND INFORMATION PROCESSING METHOD FOR SECURING PROVIDING VEHICLE DRIVER INFORMATION

CROSS REFERENCE TO THE RELATED APPLICATION

This application claims the benefit of Japanese Patent Application No. 2022-149419, filed on Sep. 20, 2022, which is hereby incorporated by reference herein in its entirety.

BACKGROUND

Technical Field

The present disclosure relates to a technique of collecting information from a vehicle.

Description of the Related Art

These days, there is a demand for proper management of personal information.

In this regard, for example, Japanese Patent Laid-Open No. 2021-081841 discloses a system for acquiring consent from a user for provision of personal information to outside, and for providing information based on presence/absence of the consent.

SUMMARY

The present disclosure is aimed at providing a technique for appropriate acquisition of personal information.

The present disclosure in its one aspect provides an information processing apparatus to be mounted on a first vehicle, the information processing apparatus comprising a controller configured to: determine whether there is a record of consent, expressed in the past, from a driver of the first vehicle for acquisition, by an external apparatus, of first data acquired by the first vehicle during traveling, and issue an inquiry to the driver, in a case where there does not exist the record of the driver giving the consent for acquisition of the first data by the external apparatus, as to whether the driver gives the consent for acquisition of the first data by the external apparatus or not.

The present disclosure in its another aspect provides an information processing method performed by an information processing apparatus to be mounted on a first vehicle, the information processing method comprising: determining whether there is a record of consent, expressed in the past, from a driver of the first vehicle for acquisition, by an external apparatus, of first data acquired by the first vehicle during traveling, and issuing an inquiry to the driver, in a case where there does not exist the record of the driver giving the consent for acquisition of the first data by the external apparatus, as to whether the driver gives the consent for acquisition of the first data by the external apparatus or not.

The present disclosure in its another aspect provides an information processing apparatus to be mounted on a first vehicle, the information processing apparatus comprising a controller configured to: identify a driver of the first vehicle, and issue an inquiry to the driver as to whether to give consent for acquisition, by an external apparatus, of first data acquired by the first vehicle during traveling, in a case where the driver of the first vehicle is not an owner of the first vehicle who is registered in advance.

As another mode, there may be cited a program for causing a computer to perform the method described above, or a non-transitory computer-readable storage medium storing the program.

According to the present disclosure, personal information may be appropriately acquired.

BRIEF DESCRIPTION OF THE DRAWINGS

FIG. 3 is an example of data that is transmitted from the vehicle-mounted apparatus to a server apparatus;

FIG. 4 is an example of request data that is transmitted from the server apparatus to the vehicle-mounted apparatus;

FIG. 5 is an example of consent data that is stored in the vehicle-mounted apparatus;

FIG. 11 is an example of a consent DB according to a second embodiment;

DESCRIPTION OF THE EMBODIMENTS

Figure 1:
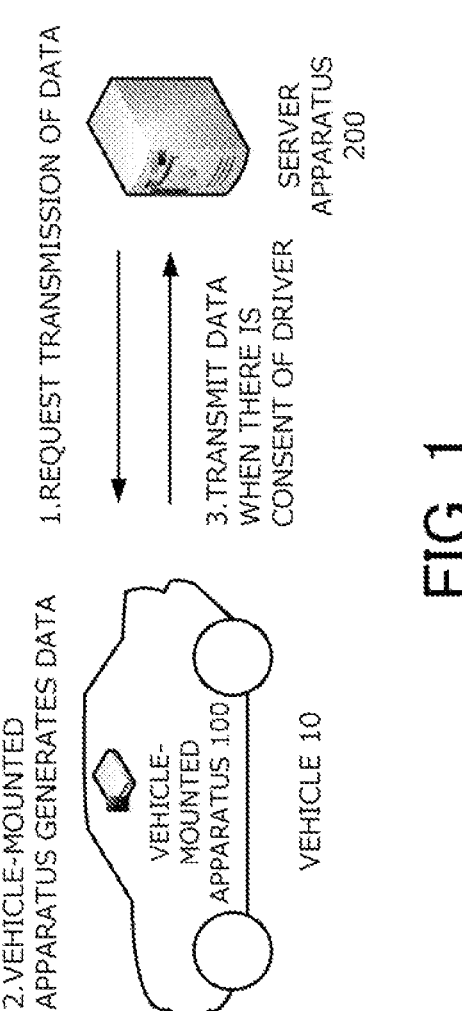
FIG. 1 is a schematic diagram of a vehicle system according to a first embodiment.

These days, there are attempts to use data collected from motor vehicles. By using data collected from vehicles as big data, various services are expected to become possible.

However, data transmitted from a vehicle may include personal information or information related to personal information. Such data may include not only personal information but also information such as position information that may cause privacy-related problems by being linked to an individual.

Accordingly, there is an attempt to acquire in advance, from a user (such as a driver or an owner of a vehicle), consent for collection and use of data. However, many pieces of data are obtained by a vehicle by sensing, and also, the number of drivers of a vehicle is not limited to one.

Accordingly, in relation to a system that collects data from a vehicle, a mechanism of managing presence/absence of consent of the driver is desirably introduced.

An information processing apparatus according to a first mode of the present disclosure is an information processing apparatus to be mounted on a first vehicle, the information processing apparatus including a controller configured to determine whether there is a record of consent, expressed in the past, from a driver of the first vehicle for acquisition, by an external apparatus, of first data acquired by the first vehicle during traveling, and issue an inquiry to the driver, in a case where there does not exist the record of the driver giving the consent for acquisition of the first data by the external apparatus, as to whether the driver gives the consent for acquisition of the first data by the external apparatus or not.

The driver is a person who is currently driving the first vehicle.

The first data is data that is acquired by the first vehicle during traveling, and is personal information of the driver, and data related to traveling of the first vehicle (such as position information, speed information, and acceleration information). The first data is also referred to as sensor data.

The controller determines presence/absence of the consent for acquisition of the first data by the external apparatus in relation to each combination of the first vehicle and the driver. The determination may be performed using a database for storing presence/absence of the consent.

In a case where there does not exist a record of the driver of the first vehicle giving the consent, in the past, for acquisition of data, the controller issues an inquiry to the driver as to presence/absence of the consent for acquisition of the data.

According to such a configuration, an inquiry is issued only when consent for transmission of target data to outside was not given by the driver in the past, and thereby influence on usability may be minimized.

The information processing apparatus may store, in association with the driver, presence/absence of consent in a database. The database may further associate a date when consent was given or data/time information.

Additionally, in the case where there is a record of consent, expressed in the past, from the driver for acquisition of the first data, the first data may be transmitted to the external apparatus without issuing an inquiry.

Additionally, an inquiry may be issued again in a case where there is a lapse of a predetermined period of time from when the consent for acquisition of the first data was given by the driver. That is, an expiration period may be set in relation to the consent. Additionally, the predetermined period of time may be determined based on frequency of the driver driving the first vehicle. For example, in a case where frequency of the driver driving the first vehicle is high, the expiration period of the consent may be set long, and in a case where the frequency is low, the expiration period of the consent may be set short.

Furthermore, in the case where there is a record of refusal, by the driver, of acquisition of the first data by the external apparatus, transmission of the first data may be prohibited without issuing the inquiry. This is because, in the case where the driver clearly expresses his/her will to refuse, issuing the inquiry again is not reasonable.

Additionally, the driver of the first vehicle may be determined based on biometric information or the like. Furthermore, driving operation data may be acquired from an electronic control unit provided in the first vehicle, and the driver may be determined based thereon. For example, the driver can be identified based on characteristics of a driving operation.

Hereinafter, specific embodiments of the present disclosure will be described with reference to the drawings. A hardware configuration, a module configuration, a functional configuration, and the like described in each embodiment are not intended to limit the technical scope of the disclosure thereto unless stated otherwise.

First Embodiment

An outline of a vehicle system according to a first embodiment will be given with reference to FIG. 1. The vehicle system according to the present embodiment includes a vehicle 10 where a vehicle-mounted apparatus 100 is mounted, and a server apparatus 200. A plurality of vehicles 10 (the vehicle-mounted apparatuses 100) may be included in the system.

The vehicle 10 is a vehicle for collecting data. The vehicle 10 is configured to be capable of collecting data about traveling and data about an occupant, and is capable of transmitting collected data to the server apparatus 200 via the vehicle-mounted apparatus 100.

As for data about traveling, data about speed, a traveling direction, position information, or behavior of the vehicle may be illustrated, for example. Furthermore, as for data about an occupant, an identifier, sex, or age of an individual may be illustrated, for example.

The server apparatus 200 is an apparatus that provides a predetermined service based on data collected from the vehicle 10. For example, by collecting position information or speed information from a plurality of vehicles 10, traffic congestion information or traffic information may be generated and then provided to other vehicles. Furthermore, by collecting data about an occupant of a vehicle, information suitable for an individual may be provided.

The server apparatus 200 requests a plurality of vehicles 10 for transmission of predetermined data, and the vehicles 10 (the vehicle-mounted apparatuses 100) transmit the data in response.

The vehicle-mounted apparatus 100 acquires, from a driver, consent for provision of data (that is, for transmission of data generated inside the vehicle to the server apparatus 200), and transmits the data only when there is consent. The vehicle-mounted apparatus 100 includes a database that stores presence/absence of consent on a per-driver basis, and the vehicle-mounted apparatus 100 determines whether there is consent from the driver (whether there is past consent) for transmission of certain piece of data based on the database.

In the vehicle system according to the present embodiment, the plurality of vehicle-mounted apparatuses 100 and the server apparatus 200 are interconnected by a network. As the network, a wide area network (WAN), which is a worldwide public communication network such as the Internet, or other communication networks may be adopted, for example. Furthermore, the network may include a mobile communication network for mobile phones, or a wireless communication network such as Wi-Fi (registered trademark).

Each element forming the system will be described.

The vehicle 10 is a connected car that includes a function of communicating with an external network. The vehicle-mounted apparatus 100 is mounted on the vehicle 10.

The vehicle-mounted apparatus 100 is a computer for collecting information. In the present embodiment, the vehicle-mounted apparatus 100 includes a plurality of sensors for collecting information about traveling of the vehicle 10, and the vehicle-mounted apparatus 100 transmits the collected data (hereinafter "sensor data") to the server apparatus 200 at a predetermined timing. The vehicle-mounted apparatus 100 may be an apparatus that provides information to an occupant of the vehicle 10 (such as a car navigation apparatus), or may be an electronic control unit (ECU) provided in the vehicle 10. Furthermore, the vehicle-mounted apparatus 100 may be a data communication module (DCM) including a communication function.

The vehicle-mounted apparatus 100 may be a computer including processors such as a CPU and a GPU, main memories such as a RAM and a ROM, and an auxiliary memory such as an EPROM, a hard disk drive, or a removable medium. The auxiliary memory stores an operating system (OS), various programs, various tables, and the like, and a function matching a predetermined object as described below may be implemented by executing a program that is stored therein. However, one or some or all of the functions may alternatively be implemented by a hardware circuit such as an ASIC or an FPGA.

Figure 2:
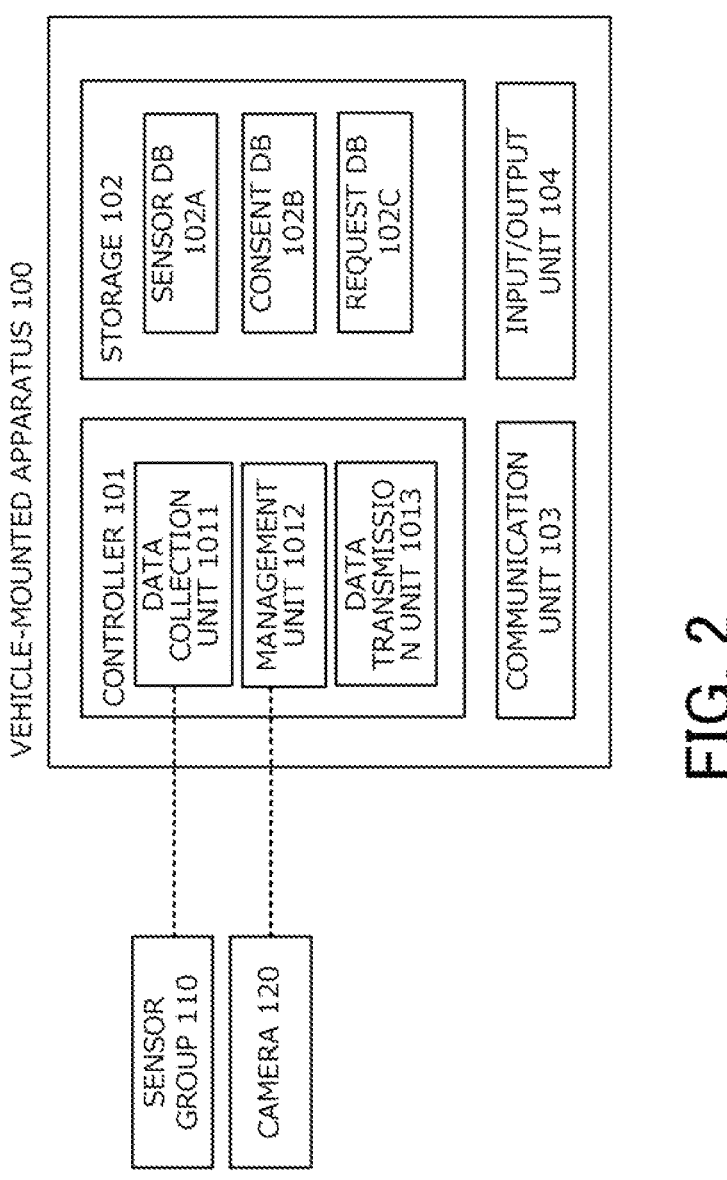
FIG. 2 is a diagram illustrating components of a vehicle-mounted apparatus.

FIG. 2 is a diagram illustrating a system configuration of the vehicle-mounted apparatus 100.

The vehicle-mounted apparatus 100 includes a controller 101, a storage 102, a communication unit 103, and an input/output unit 104. Furthermore, the vehicle-mounted apparatus 100 is connected to a sensor group 110 and a camera 120.

The controller 101 is an arithmetic unit that implements various functions of the vehicle-mounted apparatus 100 by executing predetermined programs. The controller 101 may be implemented by a CPU, for example.

As functional modules, the controller 101 includes a data collection unit 1011, a management unit 1012, and a data transmission unit 1013. Each functional module may be implemented by the CPU executing a program that is stored.

The data collection unit 1011 acquires the sensor data from one or more sensors included in the sensor group 110 at a predetermined timing, and stores the same in a sensor DB 102A in the storage 102. In the case where a plurality of pieces of sensor data may be acquired, the data collection unit 1011 may acquire all of the pieces of sensor data. The sensor DB 102A is a database where the sensor data collected from the sensor of the vehicle 10 is stored.

Figure 3:
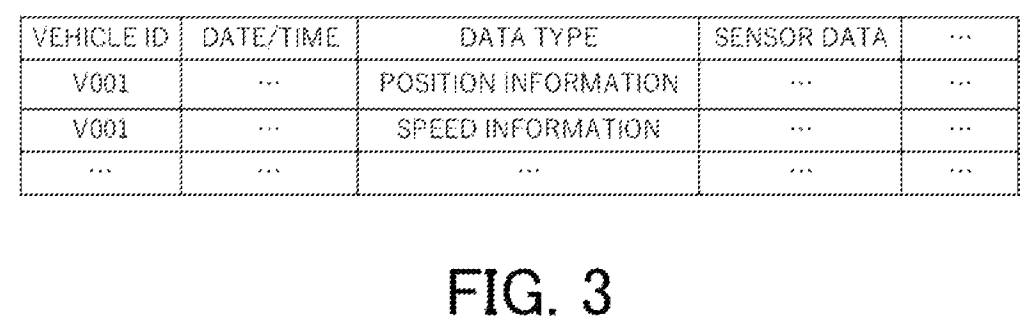

FIG. 3 is an example of the sensor DB 102A. The sensor DB 102A stores, in addition to the sensor data, an identifier of the vehicle, date/time of occurrence of the sensor data, type of the sensor data, and the like.

The management unit 1012 determines which of the pieces of sensor data stored in the sensor DB 102A is to be transmitted to the server apparatus 200. More specifically, the management unit 1012 performs the following processes.

(1) Process of Receiving Request Data from the Server Apparatus 200

The server apparatus 200 requests the vehicle 10 for data by transmitting request data to the vehicle-mounted apparatus 100. FIG. 4 is an example of the request data that is transmitted from the server apparatus 200.

The request data includes an identifier of the sensor data, type of the sensor data (data type), a transmission destination of the sensor data, an acquisition condition for the sensor data, and a transmission period of the sensor data. Additionally, the request data may also include information describing usage and the like of the sensor data.

The data type specifically specifies which sensor data is to be acquired. The sensor data may be any data that can be acquired by the vehicle 10, such as position information, speed information, or image data.

The acquisition condition specifies the condition for acquiring the sensor data. For example, in the case where the data type is image data, a location where an image is to be acquired may be specified.

The request data that is transmitted from the server apparatus 200 is stored in a request DB 102C in the storage 102.

(2) Process of Managing Consent of the Driver for External Transmission of the Sensor Data External transmission refers to transmission of the sensor data to an apparatus (such as the server apparatus 200)

outside the vehicle 10. The management unit 1012 manages data (hereinafter "consent data") indicating whether transmission of the sensor data to the server apparatus 200 is permitted by the driver or not, and determines whether the sensor data requested by the server apparatus 200 can be transmitted or not, based on the consent data and a detection result of the driver.

The consent data will now be described. The consent data is data recording whether transmission of the sensor data to outside is permitted or not, for each of driver, transmission destination, and type of sensor data. The consent data may be generated based on a result of interaction with the driver, for example.

FIG. 5 is an example of the consent data.

As illustrated, the consent data includes fields of driver ID, data type, transmission destination, and transmission permission. The driver ID field stores an identifier for uniquely identifying the driver. The data type field stores information for identifying the type of sensor data. The transmission destination field stores information for identifying the transmission destination of the sensor data. The transmission permission field stores presence/absence of consent ("permitted" or "denied") for transmission of the sensor data. Such data is stored in a consent DB 102B in the storage 102.

(3) Process of Identifying the Sensor Data that is Requested by the Server Apparatus 200 and for which there is Permission for External Transmission The management unit 1012 determines, in relation to the sensor data that is requested, whether transmission to outside is permitted or not, based on the consent data and the request data, and in the case where there is permission, the sensor data is determined to be a transmission target.

Additionally, in the case where there is no history of the driver of the vehicle 10 permitting external transmission of the target sensor data, the management unit 1012 issues an inquiry to the driver of the vehicle 10 with regard to transmission permission, and updates the consent data based on a result.

A more detailed process will be described below.

The data transmission unit 1013 acquires the sensor data determined by the management unit 1012 from the storage 102, and transmits the same to the server apparatus 200.

The storage 102 is a memory device including a main memory and an auxiliary memory. The auxiliary memory stores an operating system (OS), various programs, various tables, and the like, and a function matching a predetermined object as described below may be implemented by loading a program stored in the auxiliary memory into the main memory and by executing the same.

The main memory may include a random access memory (RAM) and a read only memory (ROM). Furthermore, the auxiliary memory may include an erasable programmable ROM (EPROM) and a hard disk drive (HDD). The auxiliary memory may further include a removable medium, or in other words, a removable recording medium.

Moreover, the storage 102 stores the sensor DB 102A, the consent DB 102B, and the request DB 102C described above.

The communication unit 103 is a wireless communication interface for connecting the vehicle-mounted apparatus 100 to a network. For example, the communication unit 103 is configured to be capable of communicating with the server apparatus 200 by a mobile communication network, a wireless LAN, or a wireless standard such as Bluetooth (registered trademark).

The input/output unit 104 is means for receiving an input operation performed by a user of the apparatus, and for presenting information, and is, in the present embodiment, implemented by one touch panel display, or in other words, by a liquid crystal display and control means thereof, or a touch panel and control means thereof.

The sensor group 110 is a collection of a plurality of sensors provided in the vehicle 10. For example, the plurality of sensors may be for acquiring data about traveling of the vehicle, such as a speed sensor, an accelerometer, and a GPS module. Moreover, the plurality of sensors may be for acquiring data about a traveling environment of the vehicle 10, such as an image sensor, a light sensor, and a rain sensor, for example.

Additionally, the sensor group 110 may include a sensor for collecting data about the driver or an occupant of the vehicle 10. For example, an occupant of the vehicle may be identified based on an image obtained by capturing inside of the vehicle, and data about the occupant may be transmitted as the sensor data.

The camera 120 is an image sensor that captures the face of the driver of the vehicle 10. It suffices if the camera 120 is disposed at a position where the face of an occupant seated in the driver's seat can be captured. An image obtained by the camera 120 is used to identify the driver of the vehicle 10.

Next, a configuration of the server apparatus 200 will be described.

The server apparatus 200 may be a computer including processors such as a CPU and a GPU, main memories such as a RAM and a ROM, and an auxiliary memory such as an EPROM, a hard disk drive, or a removable medium. The auxiliary memory stores an operating system (OS), various programs, various tables, and the like, and a function matching a predetermined object as described below may be implemented by executing a program that is stored therein. However, one or some or all of the functions may alternatively be implemented by a hardware circuit such as an ASIC or an FPGA. Additionally, the server apparatus 200 may be a single computer, or may include a plurality of computers that operate in conjunction with each other.

Figure 6:
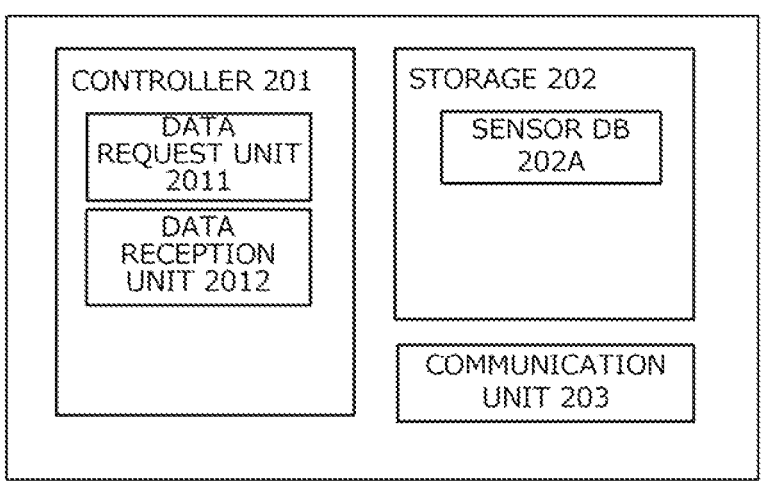
FIG. 6 is a diagram illustrating components of the server apparatus.

FIG. 6 is a diagram illustrating a system configuration of the server apparatus 200. The server apparatus 200 includes a controller 201, a storage 202, and a communication unit 203.

The controller 201 is an arithmetic device that is in charge of control that is performed by the server apparatus 200. The controller 201 may be implemented by an arithmetic processing device such as a CPU.

The controller 201 includes two functional modules, namely, a data request unit 2011 and a data reception unit 2012. Each functional module may be implemented by the CPU executing a program stored in the auxiliary memory.

The data request unit 2011 transmits the request data to a plurality of vehicles 10 (the vehicle-mounted apparatuses 100). For example, in the case where the server apparatus 200 provides a service of generating road map data based on an image captured by the vehicle 10, the server apparatus 200 generates request data requesting the vehicle 10 for image data. The type of sensor data that is requested by the server apparatus 200 may be different depending on the service that is provided by the server apparatus 200.

The data reception unit 2012 receives the sensor data from a plurality of vehicles 10 (the vehicle-mounted apparatuses 100), and stores the same in a sensor DB 202A in the storage 202. The sensor data that is stored is used to provide a predetermined service.

The storage 202 includes a main memory and an auxiliary memory. The main memory is a memory where a program to be executed by the controller 201, and data used by the control program are developed. The auxiliary memory is a device where the program to be executed by the controller 201, and the data to be used by the control program are stored.

The storage 202 stores the sensor DB 202A described above.

The communication unit 203 is a communication interface for connecting the server apparatus 200 to a network. For example, the communication unit 203 includes a network interface board, or a wireless communication circuit for wireless communication.

Additionally, the configurations illustrated in FIGS. 2 and 6 are examples, and one or some or all of the functions illustrated may be implemented by using a dedicated circuit. Furthermore, storage or execution of a program may be performed by a combination of a main memory and an auxiliary memory other than those illustrated.

Next, details of a process performed by the vehicle-mounted apparatus 100 will be described.

Figure 7:
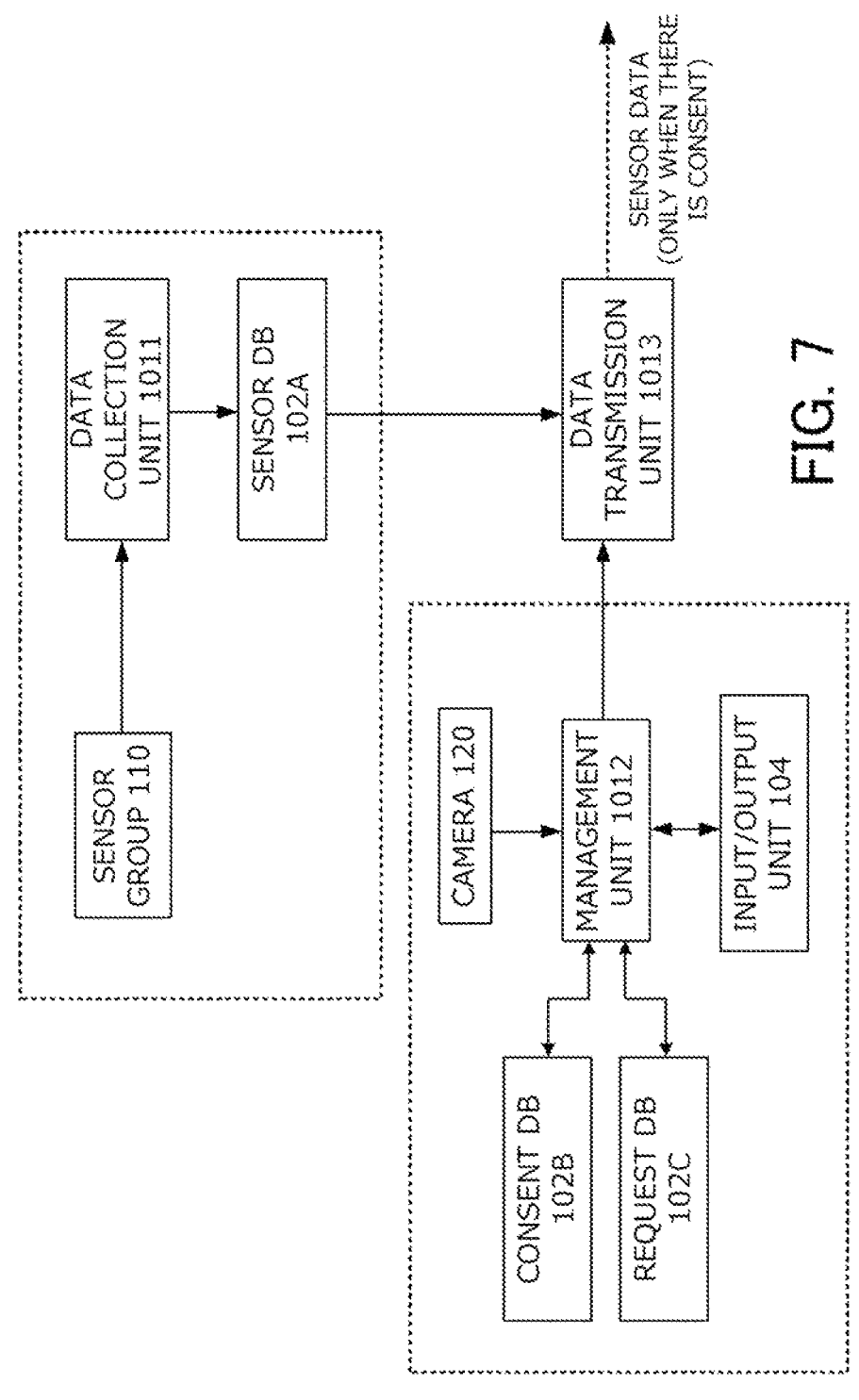
FIG. 7 is a diagram illustrating a flow of processes performed by the vehicle-mounted apparatus.

FIG. 7 is a diagram illustrating a flow of processes performed by the vehicle-mounted apparatus 100 to collect the sensor data, determine transmission target sensor data based on the request data received from the server apparatus 200, and transmit the transmission target sensor data to the server apparatus 200.

The data collection unit 1011 periodically acquires the sensor data from a sensor included in the sensor group 110, and causes the same to be stored in the sensor DB 102A in the storage 102.

Firstly, the management unit 1012 performs a process of storing, in the request DB 102C, the request data transmitted from the server apparatus 200.

Secondly, the management unit 1012 performs a process of identifying the driver of the vehicle 10, and of identifying the sensor data that can be transmitted to the server apparatus 200.

First, the management unit 1012 acquires a face image of the driver via the camera 120, and identifies the driver of the vehicle 10 based on the face image. The management unit 1012 may also hold data that is obtained by converting the face image to a feature value, and may identify the driver based on the data.

Next, the management unit 1012 determines whether the driver who is identified gave consent in the past for transmission, to the server apparatus 200, of the sensor data of the type indicated by the request data. The determination may be performed by referring to the consent DB 102B. In the case where the consent is already obtained for all the pieces of sensor data that are requested, the management unit 1012 determines to transmit the sensor data to the server apparatus 200.

Figure 8:
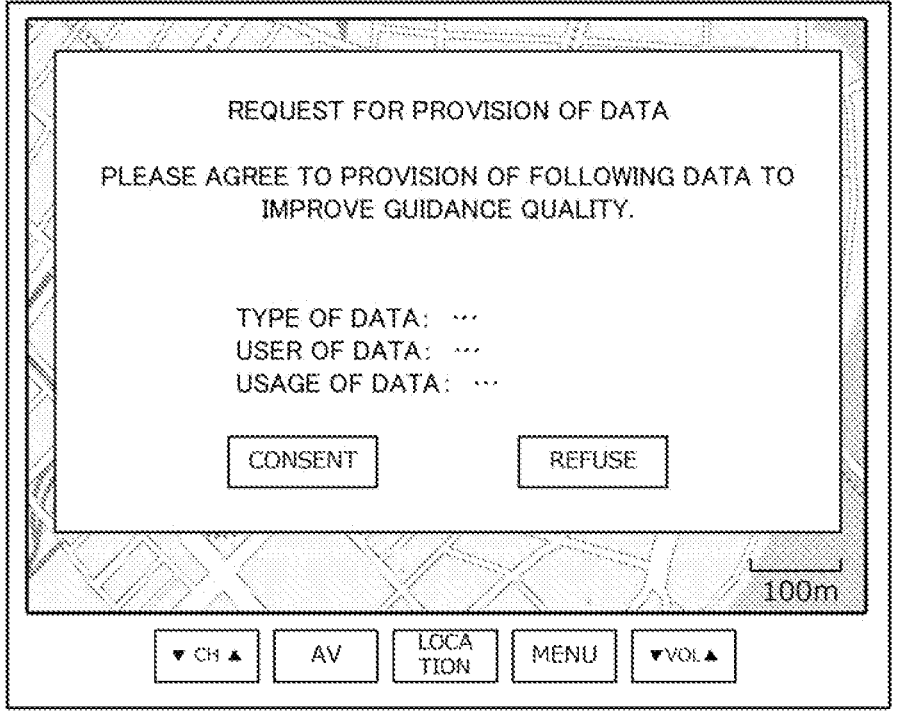
FIG. 8 is an example of a screen asking for consent for data provision.

In the case where there is data, among the pieces of sensor data that are requested, for which consent is not given, the management unit 1012 issues an inquiry to the driver as to whether there is consent or not, via the input/output unit 104. FIG. 8 is an example of a screen for issuing the inquiry. The screen includes the type of sensor data that is the transmission target, the transmission destination, a use purpose, and the like.

In the case where there is a response to the inquiry, the management unit 1012 updates the consent DB 102B based on the response.

Then, the management unit 1012 issues an instruction to the data transmission unit 1013 about the sensor data that can be transmitted to the server apparatus 200. Accordingly, only the sensor data of the type for which consent is given by the driver is transmitted to the server apparatus 200.

Next, flowcharts of the processes described above will be described. As described above, the management unit 1012 performs a process of receiving the request data from the server apparatus 200, and a process of transmitting the sensor data based on the request data that is received.

Figure 9:
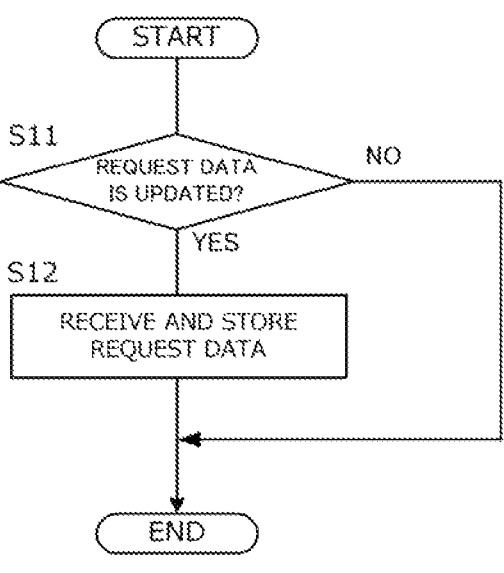
FIG. 9 is a flowchart of a process for receiving and storing the request data.

FIG. 9 is a flowchart of the process of receiving the request data from the server apparatus 200. The process illustrated is performed at a predetermined timing (such as a timing when a traveling system of the vehicle is started).

First, in step S11, an inquiry is issued to the server apparatus 200, and whether there is request data to be received or not is determined. Whether or not there is request data to be received may be determined based on last update date/time or version number of the request data, for example. Therefore, the server apparatus 200 may notify the vehicle-mounted apparatus 100 of the last update date/time or the version number of the request data, and the request DB 102C may be caused to store the same. In the case where there is request data to be received, the process proceeds to step S12.

In step S12, the request data is received from the server apparatus 200, and is stored in the request DB 102C. Old data may be deleted at this time.

Figure 10:
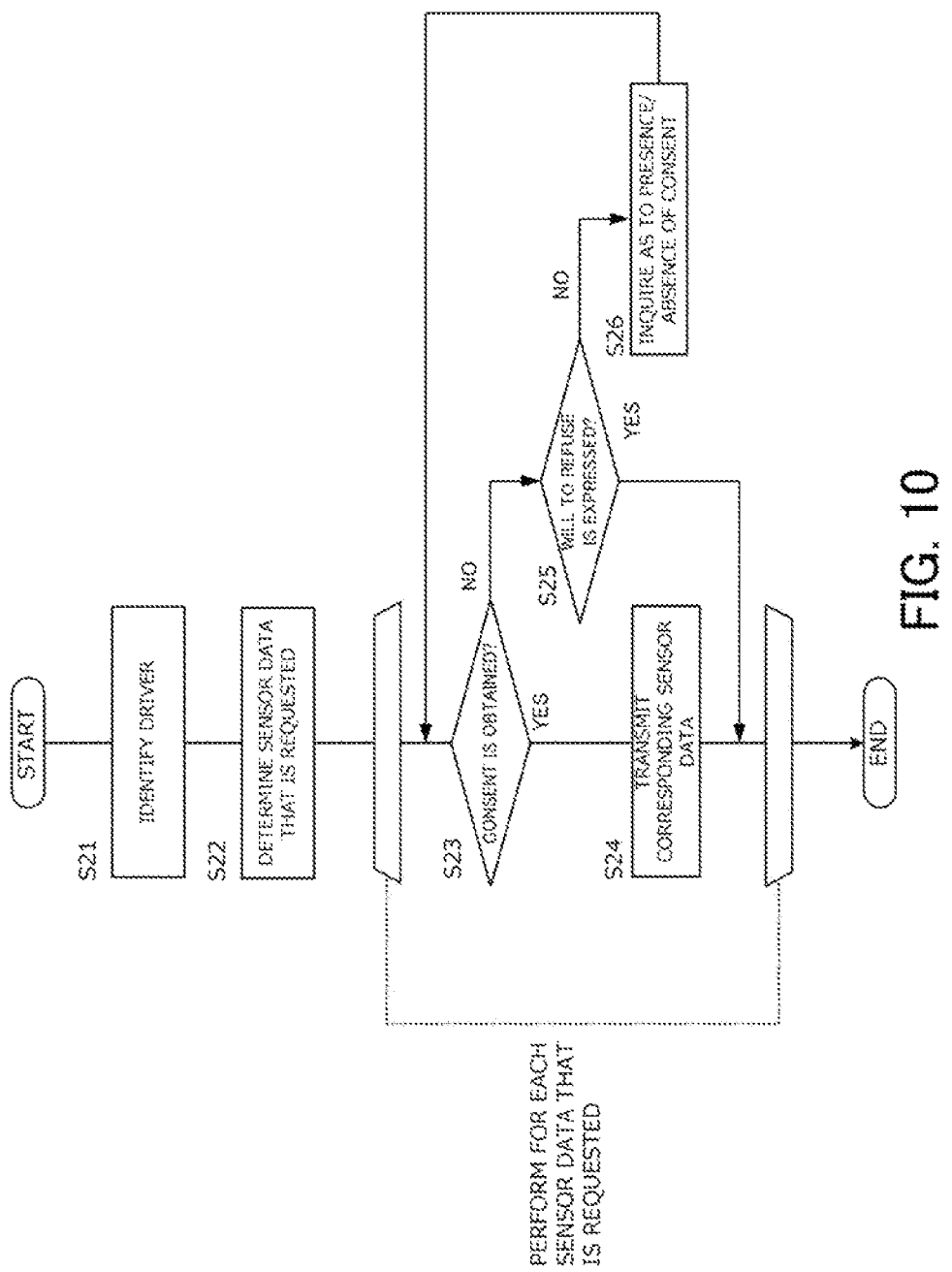
FIG. 10 is a flowchart of a process for transmitting sensor data.

FIG. 10 is a flowchart of the process of transmitting the sensor data to the server apparatus 200 based on the request data. The process illustrated is periodically performed during traveling of the vehicle 10.

First, in step S21, a face image of the driver is acquired via the camera 120, and the driver is identified based on the face image. Identification of the driver may be performed by comparing a feature value that is obtained by converting the face image with a feature value corresponding to at least one driver who is stored in advance.

In step S22, the type of the sensor data that is requested by the server apparatus 200 is determined based on the request data. In the present step, the sensor data that is requested by the server apparatus 200 and that is accumulated in the storage 102 is identified.

Processes in steps S23 to S26 are performed for each of a plurality of pieces of sensor data that are identified in step S22.

First, in step S23, whether there is consent from the driver for transmission of the target sensor data to the server apparatus 200 is determined. For example, positive determination is made in the present step in a case where there is a record, in the consent DB 102B, with a matching data type and a matching transmission destination and there is a record in which the transmission permission field is "permitted". Negative determination is made in the present step in a case where the transmission permission field is "denied", or in a case where there is no corresponding record (a case where the driver's will about external transmission is not expressed in relation to the target sensor data).

In the case where positive determination is made in step S23, the process proceeds to step S24, and the corresponding sensor data is transmitted by the data transmission unit 1013.

In the case where negative determination is made in step S23, the process proceeds to step S25.

In step S25, whether the driver expressed his/her will to refuse transmission of the corresponding data type in the past is determined. For example, positive determination is made in the present step in a case where there is, in the consent DB 102B, a record with a matching data type and a matching transmission destination and there is a record in which the transmission permission field is "denied". The corresponding sensor data is not transmitted in the case where positive determination is made in step S25.

Negative determination in step S25 means that there was no expression of will by the driver in the past in relation to the corresponding data type. In this case, the process proceeds to step S26, and an inquiry is issued as to presence/absence of consent.

In step S26, the management unit 1012 checks with the driver, via the input unit 104, whether sensor data of the corresponding type may be transmitted or not. Check may be performed via a GUI as illustrated in FIG. 8, for example.

When the driver gives a response, the result is reflected in the consent DB 102B. Furthermore, the processes in steps S23 to S25 are repeated based on the contents.

As described above, according to the first embodiment, data about presence/absence of consent for data transmission is accumulated in the vehicle-mounted apparatus 100 for each type of sensor data that is transmitted from the vehicle 10 to the server apparatus 200 and for each driver. Furthermore, based on such data, the vehicle-mounted apparatus 100 controls transmission of data to the server apparatus 200.

Moreover, the vehicle-mounted apparatus 100 issues an inquiry only when there is no past consent for data transmission, and in other cases, the will of the driver expressed in the past is respected. Accordingly, data may be acquired from the vehicle 10 without bothering the driver.

Second Embodiment

In the first embodiment, whether the sensor data can be transmitted or not is determined based on a result of expression of will (presence/absence of consent) given by the driver in the past. In contrast, a second embodiment is an embodiment in which whether the sensor data can be transmitted or not is determined by further taking into account the number of days since when consent was given.

There are cases where consent is desirably checked again after a lapse of a predetermined number of days from expression of will by the driver of the vehicle 10 made in relation to external transmission of the sensor data. Accordingly, in the second embodiment, a field indicating date/time when will of the driver was expressed is further added in the consent data. FIG. 11 is an example of the consent data according to the second embodiment.

In the second embodiment, in step S23, the date when will of the driver was expressed is further determined, and in the case where there is a lapse of a predetermined number of days (such as 180 days or one year) from the date, it is assumed that will is not expressed in relation to the sensor data of the corresponding type. According to such a configuration, the will of the driver may be re-checked on a regular basis.

Additionally, the number of days until re-check may take a fixed value, or may be dynamically determined based on frequency of driving. For example, the predetermined number of days may be set greater for a driver who drives frequently than for a driver who does not. Alternatively, the predetermined number of days may be set smaller for a driver who drives frequently than for a driver who does not.

Furthermore, to determine the frequency of driving, at the time of identifying the driver in step S21, date/time information and the identifier of the driver may be stored in the storage 102 in association with each other.

Additionally, in the case where there is a record of the driver of the vehicle 10 refusing transmission of a certain piece of sensor data, consent may be checked again after a lapse of a predetermined period of time. Alternatively, re-check does not have to be performed even after a lapse of a predetermined period of time in relation to the sensor data for which refusal was given once in the past.

Third Embodiment

Figure 12:
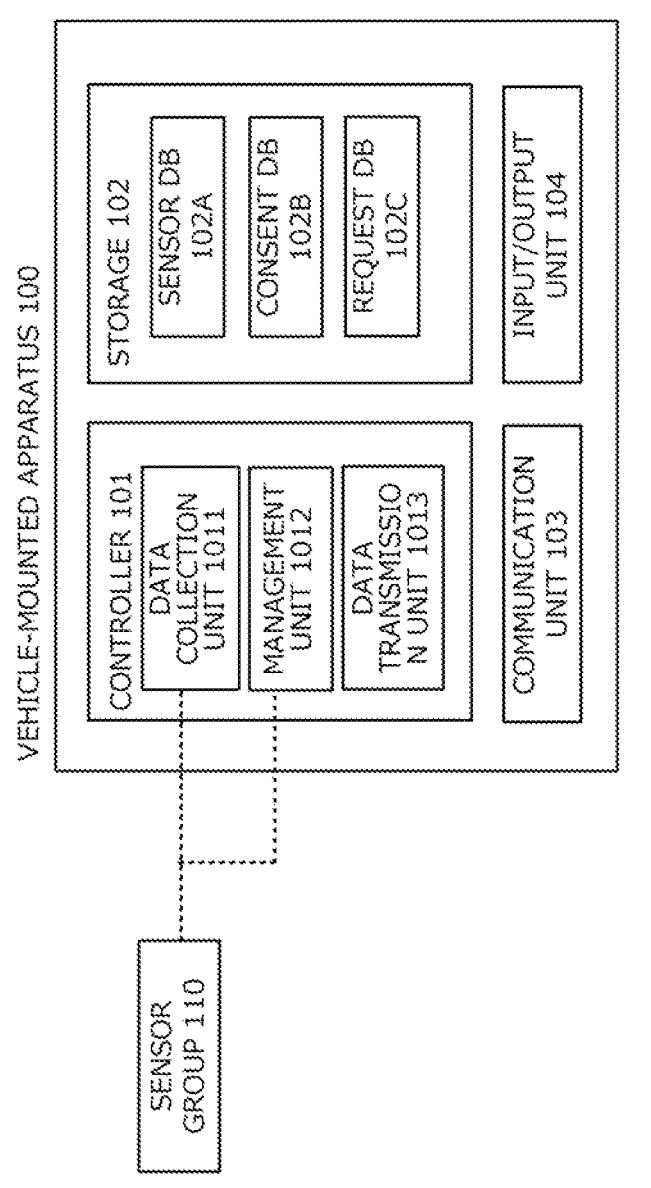
FIG. 12 is a diagram illustrating components of the vehicle-mounted apparatus according to the second embodiment.

A third embodiment is an embodiment in which characteristics of a driving operation are used as information for identifying the driver of the vehicle 10. FIG. 12 is a configuration diagram of the vehicle-mounted apparatus 100 according to the third embodiment. The present embodiment is different from the first embodiment in that the management unit 1012 is configured to be capable of acquiring information about a driving operation from the sensor group 110.

In the third embodiment, the sensor group 110 includes a sensor for sensing data about a driving operation. As such a sensor, an accelerometer, a speed sensor, or a steering angle sensor may be cited, for example. Such sensors may acquire, as the driving operation, an amount of acceleration operation, an amount of deceleration operation, and an amount of steering operation, for example. The management unit 1012 acquires a feature value corresponding to a series of driving operations based on such pieces of data.

Figure 13:
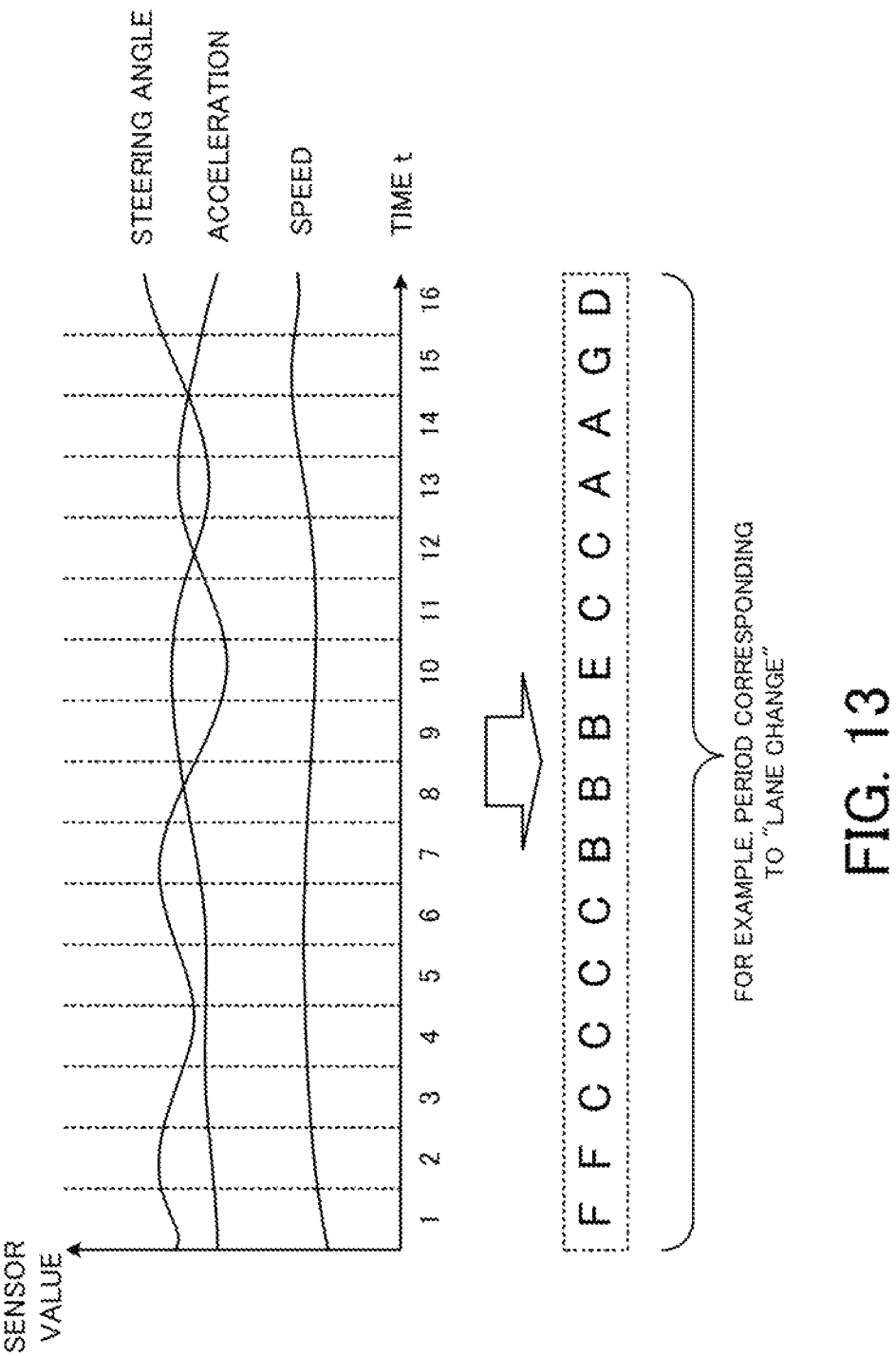
FIG. 13 is an example of a method for acquiring a feature value corresponding to a driving operation.

FIG. 13 is a diagram illustrating an example of a method of acquiring a feature value corresponding to a series of driving operations. For example, the management unit 1012 chronologically acquires a plurality of values of speed, acceleration, and a steering angle, performs clustering of the same on a per time step basis and converts the same into a symbol. Furthermore, a plurality of symbols that are obtained are grouped in units of predetermined events. In the example illustrated, in a case where there is occurrence of an event "lane change", symbols for 16 time steps are grouped. Those that have categorized the result (for example, a histogram of symbols) will be the feature value of a driving operation corresponding to a predetermined event. The management unit 1012 may also identify the driver of the vehicle 10 in step S21 by using such a feature value.

Additionally, as long as the driver of the vehicle 10 can be identified based on the driving operation, the method does not have to be limited to the one described above.

Furthermore, in the present embodiment, an example is described where data about the driving operation is acquired from the sensor group 110, but data about the driving operation (driving operation data) may also be acquired from an electronic control unit provided in the vehicle 10 (such as an engine ECU or a body ECU). For example, vehicle speed, opening of a throttle, an amount of steering operation, and the like may be acquired from such electronic control units.

(Modifications)

The embodiments described above are merely examples, and changes may be made as appropriate without departing from the scope of the present disclosure.

For example, processes and means described in the present disclosure may be freely combined and implemented to the extent that no technical conflict exists.

Furthermore, in the first and second embodiments, a face image is used as the information for identifying the driver of the vehicle 10, but the driver of the vehicle 10 may also be identified using other biometric information. As such biometric information, a fingerprint, a voiceprint, or an iris pattern may be cited, for example.

Furthermore, in the description of the embodiments, an inquiry is issued to the driver in the case where consent was not given in the past by the driver of the vehicle 10 for transmission of data to the server apparatus 200, but the inquiry may also be issued in other cases. For example, an inquiry about presence/absence of consent for data transmission may be issued in a case where the driver of the vehicle 10 is not a person who is registered in advance (typically, the owner of the vehicle 10). This is because, in a case where the driver of the vehicle 10 is not a person who is registered in advance, it can be estimated that consent for data transmission is not given. That the driver of the vehicle 10 is not a person who is registered in advance may be determined based on an identification result in step S21.

Furthermore, in the description of the embodiments, only the server apparatus 200 is illustrated as a transmission destination of the sensor data, but there may be a plurality of transmission destinations of the sensor data. In this case, the request data may be received from each of a plurality of external apparatuses. The transmission destination of the sensor data may be a manufacturer of the vehicle 10 or a related business operator, or may be a third party.

Moreover, in the description of the embodiments, consent is obtained for "transmission of the sensor data to outside the vehicle 10", but consent may also be obtained for "provision of the sensor data to a predetermined operator" or "use of the sensor data by the operator".

Moreover, in the description of the embodiments, consent of the driver of the vehicle 10 is checked, but the target of check may alternatively be a passenger as long as he/she is an occupant of the vehicle 10.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing apparatus to be mounted on a first vehicle, the information processing apparatus comprising a controller configured to:

determine whether there is a record of consent, expressed in the past, from a driver of the first vehicle for acquisition, by an external apparatus, of first data acquired by the first vehicle during traveling, and in response to the record of the driver giving consent for acquisition of the first data by the external apparatus existing, transmit the first data to the external apparatus;

in response to a lapse of a predetermined period of time from when the consent for acquisition of the first data by the external apparatus was given by the driver, issue an inquiry again to the driver, the inquiry inquiring whether or not the driver gives the consent for acquisition of the first data by the external apparatus;

in response to a record of the driver refusing acquisition of the first data by the external apparatus, prohibit issuance of the inquiry and the transmission of the first data to the external apparatus, in response to an absence of the record of the driver giving the consent for acquisition of the first data by the external apparatus, prohibit issuance of the inquiry and the transmission of the first data to the external apparatus, and issue the inquiry to the driver;

wherein the predetermined period of time is determined based on frequency of the driver driving the first vehicle, and is set greater as the frequency of the driver driving the first vehicle is higher.

2. The information processing apparatus according to claim 1, wherein the controller identifies the driver based on biometric information acquired from a sensor provided in the first vehicle.

3. The information processing apparatus according to claim 1, wherein the controller identifies the driver based on driving operation data acquired from an electronic control unit provided in the first vehicle.

4. The information processing apparatus according to claim 1, wherein the first data includes data about an occupant of the first vehicle.

5. The information processing apparatus according to claim 1, wherein the first data includes data about traveling of the first vehicle that is driven by the driver.

6. The information processing apparatus according to claim 1, further comprising a database configured to store, in association with the driver, presence/absence of the consent for acquisition of the first data by the external apparatus.

7. An information processing method performed by an information processing apparatus to be mounted on a first vehicle, the information processing method comprising:

determining whether there is a record of consent, expressed in the past, from a driver of the first vehicle for acquisition, by an external apparatus, of first data acquired by the first vehicle during traveling;

in response to the record of the driver giving the consent for acquisition of the first data by the external apparatus existing, transmitting the first data to the external apparatus;

in response to a lapse of a predetermined period of time from when the consent for acquisition of the first data by the external apparatus was given by the driver, issuing an inquiry again to the driver whether or not the driver gives the consent for acquisition of the first data by the external apparatus;

in response to a record of the driver refusing acquisition of the first data by the external apparatus, prohibiting issuance of the inquiry and the transmission of the first data to the external apparatus;

in response to an absence of the record of the driver giving the consent for acquisition of the first data by the external apparatus, prohibiting issuance of the inquiry and transmission of the first data to the external apparatus, and issuing the inquiry to the driver;

wherein the predetermined period of time is determined based on frequency of the driver driving the first vehicle, and is set greater as the frequency of the driver driving the first vehicle is higher.

8. The information processing method according to claim 7, further comprising identifying the driver based on biometric information acquired from a sensor provided in the first vehicle.

9. The information processing method according to claim 7, further comprising identifying the driver based on driving operation data acquired from an electronic control unit provided in the first vehicle.

10. The information processing method according to claim 7, wherein the first data includes data about an occupant of the first vehicle.

11. The information processing method according to claim 7, wherein the first data includes data about traveling of the first vehicle that is driven by the driver.

* * * * *